United States Patent
Muren (10) Patent No.: US 7,647,272 B1
(45) Date of Patent: Jan. 12, 2010

(54) SYSTEMS AND METHODS FOR PROVIDING AN ADJUSTABLE RATE MORTGAGE WITH A FIXED MONTHLY PAYMENT

(75) Inventor: Walter C. Muren, Frederick, MD (US)

(73) Assignee: Federal Home Loan Mortgage Corporation (FREDDIE MAC), McLean, VA (US)

(*) Notice: Subject to any disclaimer, the term of this patent is extended or adjusted under 35 U.S.C. 154(b) by 874 days.

(21) Appl. No.: 10/731,433

(22) Filed: Dec. 10, 2003

(51) Int. Cl.
*G06Q 40/00* (2006.01)
(52) U.S. Cl. .......................... 705/38; 705/35
(58) Field of Classification Search .................. 705/38, 705/35
See application file for complete search history.

(56) References Cited

U.S. PATENT DOCUMENTS

| | | | | |
|---|---|---|---|---|
| 5,742,775 A * | 4/1998 | King | ........................... | 705/38 |
| 5,878,404 A * | 3/1999 | Stout et al. | ..................... | 705/38 |
| 2005/0004860 A1* | 1/2005 | Pretell et al. | .................. | 705/38 |

OTHER PUBLICATIONS

R J Bennett, Annuities and Bond Discount, Jul. 1915, Journal of Accountancy, pp. 8-9.*

* cited by examiner

*Primary Examiner*—F. Zeender
*Assistant Examiner*—Fahd A Obeid
(74) *Attorney, Agent, or Firm*—Finnegan, Henderson, Farabow, Garrett & Dunner, LLP (57) ABSTRACT

Systems and methods are described for processing mortgage payments. In one embodiment, the method includes receiving a fixed payment for the mortgage, such fixed payment being based on an initial interest rate, with the initial interest rate serving as a maximum interest rate; determining a principal and interest payment amount based on a revised interest rate, the revised interest rate not exceeding the maximum interest rate; determining a difference between the fixed payment and the determined principal and interest amount, so that any difference may prepay the mortgage.

33 Claims, 5 Drawing Sheets

SYSTEMS AND METHODS FOR PROVIDING AN ADJUSTABLE RATE MORTGAGE WITH A FIXED MONTHLY PAYMENT

BACKGROUND OF THE INVENTION

I. Field of the Invention

The present invention generally relates to financial systems and to systems and methods for processing financial information. More particularly, the invention relates to systems and methods for providing an adjustable rate mortgage with a fixed payment.

II. Background and Material Information

In financial environments where interest rates rise and fall, borrowers frequently refinance their fixed-rate mortgages to take advantage of lower interest rates. Although in the end, the borrower may save money through reduced monthly payments, borrowers incur closing costs in order to refinance their mortgage. These costs may be significant and may include, for example, county recordation, settlement fees, appraisal fees, credit history fees, title insurance fees, and other loan fees. In many cases, it may be one or two years before a borrower is able to recoup these refinancing costs through lower monthly payments. In many situations, the borrower increases the outstanding debt owed by adding the cost of refinancing to the principal balance of the mortgage. Indeed, some borrowers may refinance one or more times within months of each refinance transaction, further compounding the costs and lengthening the time it takes to recoup refinancing costs. Additionally, refinancing of a mortgage will typically require the borrower to complete an application and provide documentation of income and employment, all of which take time and are generally inconvenient. In short, borrowers typically want to save money, have lower payments, repay the mortgage as quickly as possible, and have the peace of mind of knowing the payment amount for the entire term of the mortgage. For these reasons, when a borrower does choose to refinance, the borrower may prefer to have a fixed rate mortgage with a fixed payment at the lowest rate possible.

Refinancing may also present disadvantages to a lender. From a lender's prospective, the original mortgage note represents a future stream of income with a yield based generally on the interest rate of that mortgage. When a mortgage is refinanced, the income stream stops. Although in the example above a new fixed rate mortgage may take its place and provide another income stream, the new, refinanced mortgage is typically at a lower rate—representing thus a lower yield. Moreover, lenders may sell (or securitize) one or more mortgage notes to investors. Like lenders, investors prefer higher yields and thus prefer to have a low refinancing turnover. Additionally, when a borrower refinances a mortgage, the borrower may refinance with a different lender, which reduces the original lender's servicing portfolio.

An alternative to a fixed-rate mortgage is the adjustable rate mortgage. Unlike the fixed-rate mortgage that has a fixed interest rate for the term of the mortgage (typically 15 to 30 years), the adjustable rate mortgage has an interest rate that is periodically adjusted (per the terms of the mortgage) to more closely coincide with the then current interest rates. For example, when interest rates fall during the interest rate reset period, the adjustable rate mortgage adjusts its interest rate lower, which results in lower monthly payments. On the other hand, when current interest rates rise during the interest rate reset period, the adjustable rate mortgage adjusts its interest rate higher, which results in higher monthly payments for the borrower.

In environments where current interest rates are falling, borrowers may use an adjustable rate mortgage to avoid refinancing their mortgage and to avoid the costs associated with refinancing. Nevertheless, in environments where current interest rates are rising (or are expected to rise), some borrowers view the adjustable rate mortgage as too risky because the interest rate and the corresponding monthly payments may be adjusted higher. Borrowers may also be concerned that they cannot afford the higher monthly payments. Accordingly, a mortgage product is needed that provides the borrower with some predictability and reduces the call for refinancing in both increasing and decreasing interest rate environments.

SUMMARY OF THE INVENTION

Accordingly, the present invention is directed to systems and methods for processing financial information and, more particularly, systems and methods for providing an adjustable rate mortgage with a fixed payment.

Systems and methods consistent with the present invention may receive a fixed payment for a mortgage, such fixed payment being based on an initial interest rate, with the initial interest rate serving as a maximum. Moreover, systems and methods consistent with the present invention may determine a principal and interest amount based on a revised interest rate with the revised interest rate not exceeding the maximum. Furthermore, systems and methods consistent with the present invention may determine a difference between the fixed payment and the principal and interest amount determined at the revised interest rate and then pay the mortgage based on the difference. Furthermore, in one embodiment, the term associated with the mortgage may be reduced by prepaying the mortgage based on the determined difference.

In another embodiment consistent with the systems and methods of the present invention, there is provided a mortgage product including a fixed payment obligation determined based on a first interest rate, wherein the fixed payment obligation requires a borrower to make a fixed payment for a term associated with the mortgage product. Moreover, the mortgage product includes an adjustable interest rate, wherein the adjustable interest rate may enable the borrower to reduce the term by prepaying the mortgage while making the fixed payment, and wherein the adjustable interest rate does not exceed the first interest rate.

Additional features and advantages of the invention will be set forth in part in the description which follows and in part will be obvious from the description, or may be learned by practice of the invention. The features and advantages of the invention may be realized and attained by the system and method particularly described in the written description and claims hereof as well as the appended drawings.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings.

DETAILED DESCRIPTION

Systems and methods consistent with the present invention may provide an adjustable rate mortgage (ARM) with a fixed payment (herein also referred to as a fixed payment ARM).

In one aspect of the invention, the adjustable rate mortgage includes a fixed payment that excludes taxes and insurance. The fixed payment is calculated based on an initial interest rate, initial loan amount, and a term or amortization period, which is determined at mortgage closing (or origination). If current interest rates fall below the initial interest rate, the lender, per the terms of the mortgage, may automatically lower the interest rate on the mortgage during the interest rate reset period. In another embodiment, the borrower may make a request to the lender to adjust the mortgage interest rate to a lower interest rate. Moreover, the borrower may be allowed to request a lower rate only at certain times, as specified in the mortgage. If the lender agrees to the lower interest rate and modifies the fixed payment ARM to take advantage of the revised, lower rate, the borrower continues to make the same, fixed payment. However, since the fixed payment is being applied to a mortgage loan with a revised, lower interest rate, the fixed payment amount will exceed the amount of principal and interest (P&I) required to satisfy the fixed payment ARM at the revised, lower interest rate. The difference between the fixed payment and the current P&I amount (determined at the revised, lower interest rate, the remaining principal balance, and the remaining term) may serve to prepay a greater amount of the principal balance of the mortgage. As such, if current interest rates fall, a borrower's payment would be applied as prepayments to the fixed payment ARM, so that the mortgage may be paid in a shorter time frame. For example, if the lender lowers the interest rate, the borrower may take advantage of a lower interest rate. When this is the case, the difference associated with the fixed payment and the determined P&I amount may permit the borrower to pay a 30-year mortgage in 25-years. Moreover, the borrower may be less likely to refinance, since the mortgage may take advantage of lower current interest rates without requiring a new mortgage with significant closing costs and fees.

One of ordinary skill in the art will recognize that the borrower may be permitted to make additional principal payments over and above the fixed payment—enabling the mortgage to amortize (or liquidate) over a shorter term.

As used herein, the term "mortgage" means a temporary, conditional pledge of property, usually for a specific period of time (e.g., 30 years), to a creditor as security for performance of an obligation or repayment of a debt. Moreover, as used herein the term "mortgage" may include a paper, note, contract, security, or deed, all of which may represent the mortgage and/or the terms of the mortgage.

As used herein, the term "fixed payment" means the maximum contractual payment of principal and interest that will be due on a mortgage. The maximum payment may be due at periodic time periods (e.g., yearly, monthly, or biweekly), as specified by the terms of the mortgage. In one embodiment, the fixed payment may be determined at the initial interest rate used when the mortgage is initially executed, for example, at mortgage close. The initial interest rate serves as a maximum (or cap) interest rate for the duration of the loan. As such, any principal and interest amounts due on an adjusted (or revised) interest rate may not exceed the fixed payment.

In one embodiment of the invention, if current interest rates increase, a lender may increase the interest rate of the fixed payment ARM. The lender may revise (or adjust) the interest rate higher, but this rate increase may not exceed the initial interest rate used to determine the fixed payment. As noted above, the initial interest rate effectively serves as a maximum (or "cap") interest rate for the fixed payment ARM. Moreover, when the initial interest rate serves as a cap, each fixed payment made by the borrower will reduce the amount of principal owed on the mortgage, i.e., the mortgage will always amortize positively. For example, when a lender increases (but not exceeding the cap) the interest rate associated with the mortgage, the lender continues receiving the fixed payments that were determined at mortgage closing (or origination). The fixed payments are applied to the ARM at a revised, increased interest rate. Although the revised (or adjusted) interest rate is adjusted higher, it is still lower than the initial maximum interest rate used to initially determine the fixed payment amount. As such, the fixed payment amount will exceed the P&I amount determined at the revised, higher interest rate. As long as the revised interest rate associated with the fixed payment ARM remains below the initial interest rate (or cap), the borrower prepays the fixed payment ARM and reduces its term—resulting in savings to the borrower.

On the other hand, if the interest rate of the fixed payment ARM is adjusted to equal the initial interest rate, the fixed payment does not serve to prepay the mortgage. In this case, however, the borrower is no worse off than when the fixed payment ARM mortgage was originated, since the mortgage will be paid within the loan term agreed to at closing. Moreover, since the initial interest rate serves as a cap (or maximum), the borrower will never pay more than the fixed payment that was determined based on the initial interest rate, the loan amount, and loan term. To illustrate this point by way of a non-limiting example, if interest rates do not fall or rise above the initial interest rate, the borrower makes fixed payments for the life (or term) of the fixed payment ARM, and it will be paid under its original terms, e.g., 30 years. On the other hand, if current interest rates fall, the borrower may lower the interest rate of the fixed payment ARM, and thus make fixed payments that serve to prepay the mortgage, reducing the term of the mortgage to, e.g., 25 years.

Figure 1:
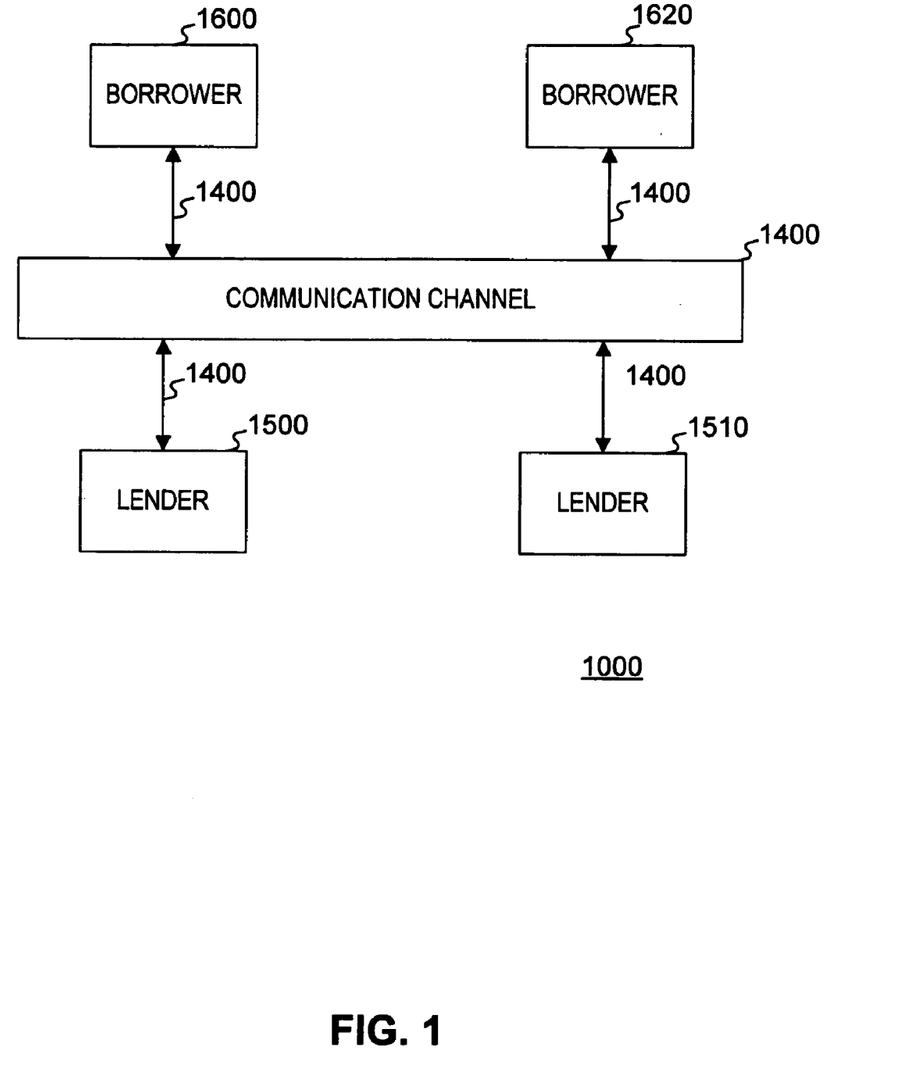
FIG. 1 illustrates an exemplary system environment in accordance with systems and methods consistent with the present invention.

FIG. 1 shows an exemplary system 1000 for providing a fixed payment ARM. Referring to FIG. 1, the system includes one or more borrowers 1600, 1620, one or more lenders 1500, 1510, and a communication channel (or network) 1400.

Lenders 1500, 1510 may include a financial entity, such as a bank, mortgage bank, mortgage broker, mortgage originator, and/or any other entity capable of providing an adjustable rate mortgage with a fixed payment. Borrowers 1600, 1620 may include any entity, such as a consumer, seeking a mortgage loan. One of ordinary skill in the art will recognize that a broker may also serve as one of the borrowers 1600, 1620.

Figure 2:
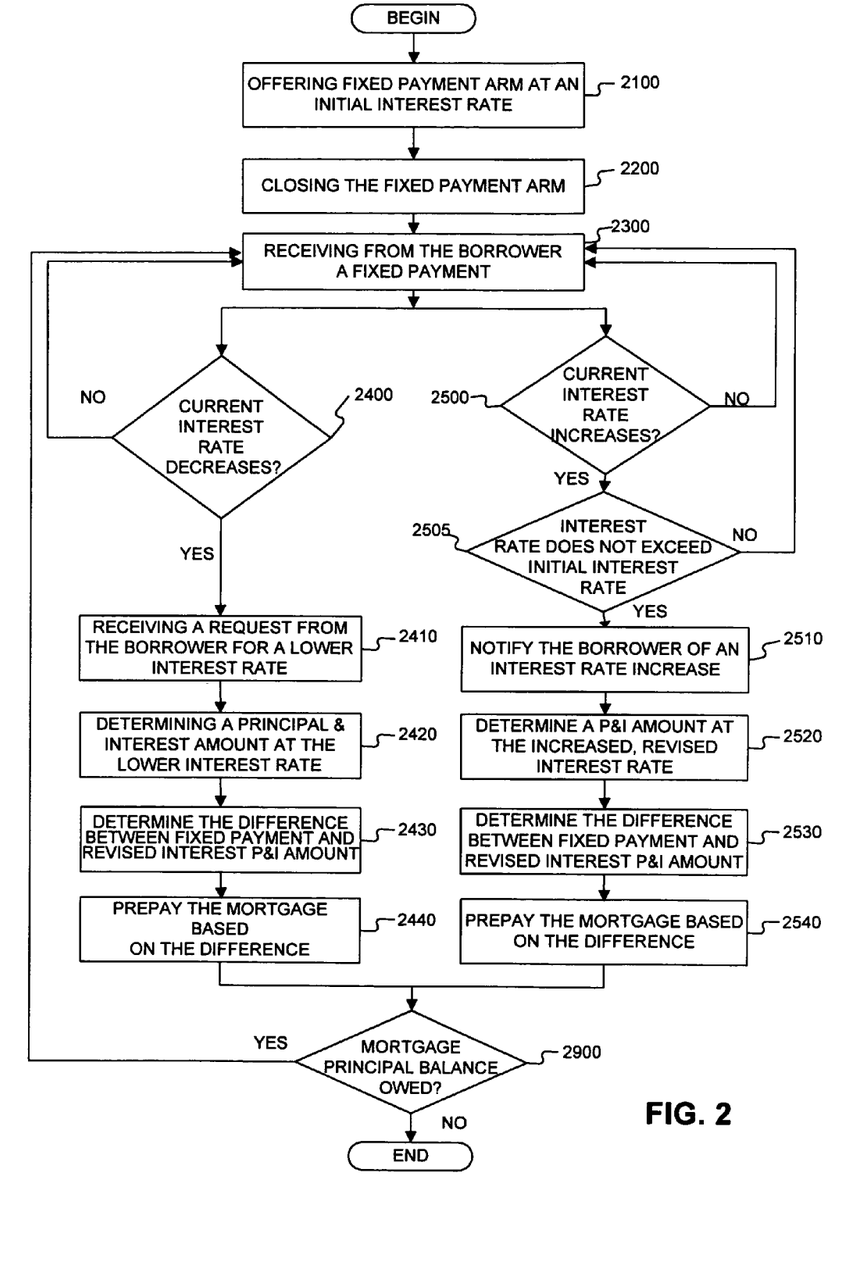
FIG. 2 is an exemplary flow chart for providing an adjustable rate mortgage with a fixed payment in accordance with systems and methods consistent with the present invention.

FIG. 2 represents a flowchart for providing a fixed payment ARM. Referring to FIGS. 1 and 2, lender 1500 may offer to borrower 1600 a fixed payment ARM, with a fixed, monthly payment amount (step 2100). After closing, lender 1500 receives fixed payments from the borrower to be applied toward the borrower's fixed payment ARM (steps 2200-2300). The term "fixed payment" is fixed for the life of the fixed payment ARM and does not include tax payments and insurance payments or other escrow items. If current interest rates fall, lender 1500 may receive from borrower 1600 a request to adjust the interest rate lower (steps 2400-2410). If lender 1500 agrees to the lower interest rate, lender 1500 may determine a P&I amount at the lower interest rate, and determine a difference (if any) between the fixed payment and the revised, lower interest P&I amount (steps 2420-2430). Lender 1500 then applies any difference to prepay the remaining principal balance on the mortgage (step 2440). If there is any outstanding balance on the fixed payment ARM (step 2900), lender 1500 continues receiving the fixed payments (step 2300).

When current interest rates rise but do not exceed the initial interest rate (or cap) (steps 2500-2505), lender 1500 may notify the borrower that the interest rate of the fixed payment ARM will increase (step 2510); determine a P&I amount at the revised, higher interest rate (step 2520); and determine a difference (if any) between the fixed payment and the higher interest P&I amount (step 2530). Lender 1500 may then apply any difference to prepay the remaining principal balance on the mortgage (step 2540). If any mortgage principal remains outstanding (step 2900), lender 1500 may continue to receive fixed payments (step 2300). The following describes the steps of FIG. 2 in greater detail.

To offer a borrower 1600 an adjustable rate mortgage with a fixed monthly payment (step 2100), lender 1500 (or a data processor therein, which is not shown) may offer to borrower 1600 a fixed payment ARM, with terms and conditions such as loan amount, loan term (or amortization period), initial interest rate, the fixed payment amount, index, margin, interest rate cap, periodic rate cap, adjustment periods, and adjustment requirements for the fixed payment. The adjustable interest rate of the fixed payment ARM may also vary over the term of the mortgage. In one aspect of the invention, the adjustable interest rate of the fixed payment ARM may not exceed a maximum interest rate. In one embodiment, the maximum (or "cap") interest rate is equal to the initial interest rate at which the fixed payment ARM was originated. For example, at origination (or closing) of the fixed payment ARM, the initial interest rate may be used to determine the fixed payment and may be used as the cap. Although the fixed payment amount may be determined in a variety of ways, such as through the use of an amortization table or equation, in one embodiment, the following equation is used:

$$\text{Fixed Payment Amount} = \text{Loan Amount} \times \frac{\text{Monthly Interest}}{\text{Interest Factor}} \quad \text{Equation 1}$$

where the Loan Amount is the outstanding (or remaining) loan balance, Monthly Interest is interest based on a monthly period, and the Interest Factor is determined as follows:

$$\text{Interest Factor} = [1 - (1 + \text{Monthly Interest})]^{-Periods} \quad \text{Equation 2}$$

where Periods is the number of monthly periods remaining on the term of the loan (e.g., 30 years×12 months=360 periods).

To close on the adjustable rate mortgage (step 2200), lender 1500 and borrower 1600 execute documents indicating the completion of the transaction. At closing, lender 1500 usually provides the loan amount to borrower 1600 in exchange for a mortgage.

After closing, lender 1500 may begin receiving fixed payments (or an indication that the payment has been received) from borrower 1600 (step 2300). The fixed payments are applied to the mortgage. As fixed payments are made, a portion of the fixed payment reduces the outstanding mortgage principal, while another portion of the fixed payment is applied to satisfy the interest charges due on the mortgage. Over time, the fixed payment reduces the outstanding principal balance of the fixed payment ARM, such that the mortgage fully amortizes (paid to a zero balance) in accordance with the terms specified in the mortgage (if not sooner). Table 1 below shows an excerpt of an exemplary amortization table for a loan amount of $100,000, a 7% interest rate, a 30-year term, and a fixed payment of $664. TABLE 1 shows a fixed payment of about $664 (see also the sum of principal and interest) and a corresponding reduction in the remaining loan balance. In TABLE 1, the initial 7% interest rate is also the maximum interest rate over the term of the fixed payment ARM.

Although the above embodiment describes a lender receiving the fixed payment, one of ordinary skill in the art would recognize that any entity may receive the fixed payment, including a mortgage servicer that services the fixed payment ARM for lender 1500. Moreover, lender 1500 may sell (or securitize) the mortgage note or an interest in the note. When that is the case, one of ordinary skill in the art may recognize that any entity may serve as a lender including, for example, an investor, a broker, a note holder, or a securities investor.

TABLE 1

FIXED PAYMENT ARM AMORTIZATION TABLE (WITH A CONSTANT 7% INTEREST RATE)

| FIXED PAYMENT | Principal | Interest | Month | Remaining Loan Balance |
|---|---|---|---|---|
| $664 | $81 | $583 | June 2003 | $99,918 |
| $664 | $82 | $582 | July 2003 | $99,835 |
| $664 | $82 | $582 | August 2003 | $99,752 |
| $664 | $83 | $581 | September 2003 | $99,669 |
| $664 | $83 | $581 | October 2003 | $99,585 |
| $664 | $84 | $580 | November 2003 | $99,500 |
| $664 | $84 | $580 | December 2003 | $99,416 |
| $664 | | | ... | |
| $664 | $661 | $0 | May 2033 | $0 |

TABLE 1 also illustrates that if interest rates remain unchanged for whatever reason, lender 1500 continues to receive fixed payments (e.g., $664) from borrower 1600 until the loan balance is zero (0), which, in this example, means that the loan will be paid in 30-years. If current interest rates rise above the initial interest rate of the fixed payment ARM, neither borrower 1600 nor lender 1500 may adjust the interest rate above the initial interest rate, which is 7% in TABLE 1. As such, lender 1500 receives fixed payments (e.g., $664) from borrower 1600 for the life of the fixed rate ARM.

If current interest rates fall (step 2400), lender 1500 may automatically reduce the interest rate or may receive from borrower 1600 a request to adjust the interest rate lower (step 2410). As interest rates move lower, the fixed rate ARM may enable the borrower to request a lower interest rate for the fixed payment ARM. Before accepting the lower interest rate request, lender 1500 may require borrower 1600 to satisfy one or more terms and conditions, such as a satisfactory credit history, payment of a fee, and/or a satisfactory property appraisal. Lender 1500 may also limit the number, when and how frequently the requests (or automatic adjustments) may be made (e.g., yearly requests and not to exceed five requests over the life of the fixed payment ARM). In one embodiment, borrower 1600 may make a request for a lower interest rate to lender 1500 through a communication channel 1400, such as the Internet. In an alternative embodiment, rather than waiting for borrower 1600 to initiate the lower interest rate request, lender 1500 may initiate the lower interest rate adjustment by notifying borrower 1600 of the lower interest rate and/or accepting the lower interest rate.

When automatically adjusting or accepting a request to lower the interest rate, lender 1500 may determine a P&I amount based on a lower interest rate, a remaining balance associated with the mortgage, and a remaining term associated with the mortgage (step 2420). To determine the P&I amount, lender 1500 uses the following equation:

$$P\&I\ Amount = Loan\ Amount \times \frac{Lower\ Interest\ Rate}{Interest\ Factor} \quad \text{Equation 3}$$

where Loan Amount is the outstanding loan balance, Lower Interest Rate is the lower interest rate requested by the borrower (or agreed to by the lender), and Interest Factor is determined based on Equation 2 above. For example, using Equation 3 at an interest rate of 5.45%, a loan amount of $100,000, and a loan term of 30 years, the determined P&I amount is about $564. Although any current interest rate may be used, in this example, the 5.45% interest rate is an interest rate offered by lender 1500, which is based on Freddie Mac's 30-day required net yield plus a fixed amount.

To determine the difference (step 2430), lender 1500 (or a data processor therein) finds the difference between the fixed payment made by the borrower and the revised P&I amount determined in step 2420. Returning to the above example, the revised P&I amount is about $564. The fixed payment is about $664. Accordingly, the difference is about $100 ($664 minus $564).

Lender 1500 then applies the difference (i.e., $100) toward the remaining principal balance of the mortgage—prepaying the fixed payment ARM (step 2440). One of ordinary skill in the art would recognize that prepaying the principal on a mortgage means that the term of the mortgage may be reduced by making a principal payment towards the mortgage before the principal payment is actually due. If any mortgage principal remains outstanding (step 2900), lender 1500 continues receiving the fixed payments (e.g., $664) until the loan balance is paid in full (step 2300).

Returning to the previous example, TABLE 2 below depicts an amortization table that applies the $100 difference towards the fixed payment ARM. One of ordinary skill will recognize that the entire fixed payment is applied toward the mortgage. The difference between the fixed payment made by the borrower (e.g., $664) and the revised P&I amount (e.g., $110+$454=$564) serves to prepay the outstanding balance of the fixed payment ARM. As can be seen from TABLE 2, the fixed payment ARM completely pays off the principal balance in 20 years, which shortens the life of the fixed payment ARM by 10 years.

TABLE 2

FIXED PAYMENT ARM AMORTIZATION TABLE
(WITH A LOWER 5.45% INTEREST RATE)

| FIXED PAYMENT | Principal | Int rest | Additional Principal Applied To The Outstanding Balance (fixed payment minus revised P&I payment amount) | Month | Loan Balanc |
|---|---|---|---|---|---|
| $664 | $110 | $454 | $100 | June 2003 | $99,789 |
| $664 | $111 | $453 | $100 | July 2003 | $99,578 |
| $664 | $112 | $452 | $100 | August 2003 | $99,365 |
| $664 | $113 | $451 | $100 | September 2003 | $99,152 |
| $664 | $114 | $450 | $100 | October 2003 | $98,937 |
| $664 | $115 | $449 | $100 | November 2003 | $98,722 |
| $664 | $116 | $448 | $100 | December 2003 | $98,506 |
| $664 | | | | . . . | |
| $563 | $541 | $22 | | May 2023 | $0 |

When current interest rates rise, lender 1500 may notify the borrower that the interest rate of the fixed payment ARM will rise (step 2510). In one aspect of the invention, the interest rate may not, however, rise above a maximum interest rate, which may be set as the initial interest rate determined at closing of the fixed payment ARM. For example, if current interest rates rise immediately after closing, lender 1500 may not be able to adjust the interest rate upwards, since the initial interest rate serves as a cap. However, if interest rates initially fall (and borrower 1600 takes advantage of the lower interest rate by adjusting the interest rate on the fixed payment ARM through steps 2400-2440), lender 1500 may increase the interest rate associated with the fixed payment ARM and still not exceed the initial interest rate (or cap).

As current interest rates move higher, the fixed rate ARM may enable lender 1500 to notify borrower 1600 that the interest rate for the fixed payment ARM will increase (step 2510). As noted above, any changes in interest rate may be specified in an agreement between lender 1500 and borrower 1600. The agreement may include terms and conditions as a prerequisite to making interest rate modifications to the fixed payment ARM. For example, lender 1500 may only be permitted to raise the interest rate annually and/or be based on an index, such as the Freddie Mac 30-day Required Net Yield (or similar benchmark) plus a fixed amount. In one embodiment, lender 1500 may notify borrower 1600 of interest rate adjustments through communication channel 1400, such as the Internet, or, alternatively, through regular mail, facsimile, or electronic mail.

To determine a P&I amount at the higher interest rate (step 2520), lender 1500 may determine the P&I amount using Equation 3 above. Returning to the above example of TABLE 2, where the fixed payment ARM was modified to 5.45%, lender 1500 may increase the rate to 6.00%, which is still below the initial interest rate (or cap) of 7%. When that is the case, the P&I amount is about $599 (see, e.g., Equation 3), which assumes a loan amount of $100,000, a 6.00% interest rate, and a 30-year term. Lender 1500 may then determine the difference between the fixed payment (e.g., $664) and the P&I amount (e.g., $599) determined at the revised, higher interest rate (step 2530). In this example, the difference is $65. Lender 1500 may then apply the difference toward the fixed payment ARM—prepaying the fixed payment ARM (step 2540).

TABLE 3 below depicts a fixed payment ARM amortization table, with a 6.00% interest rate, as noted in the example above. Referring to TABLE 3, even when the interest rate rises from 5.45% to 6.00%, the fixed payment is sufficient to enable prepayments to the mortgage, which shortens the term of the mortgage by about eight years (ending in 2025 instead of 2033). If any mortgage principal remains outstanding (step 2900), lender 1500 continues to receive the fixed payments determined at step 2300.

Figure 4:
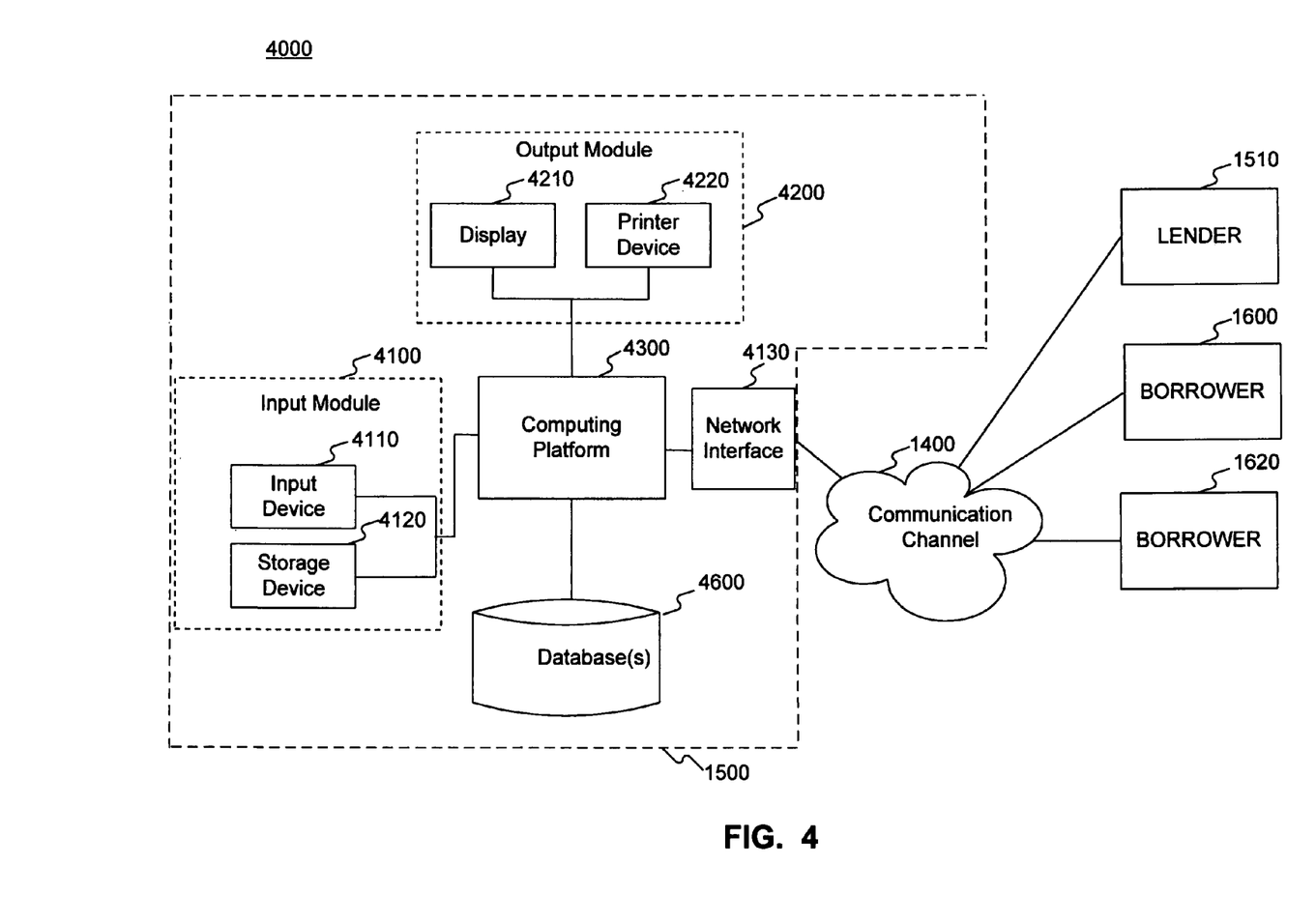
FIG. 4 is another exemplary system environment in accordance with systems and methods consistent with the present invention.

1400, one or more lenders 1500, 1510, and one or more borrowers 1600, 1620. Lender 1500 may further include an input module 4100, an output module 4200, a computing platform 4300, a database(s) 4600, and a network interface 4130.

In one embodiment consistent with FIG. 4, computing platform 4300 may include a data processor such as a PC, UNIX server (or workstation), or mainframe computer for performing various functions and operations. Computing platform 4300 may be implemented, for example, by a general purpose computer or data processor selectively activated or reconfigured by a stored computer program, or may be a specially constructed computing platform for carrying-out the features and operations disclosed herein. Moreover, computing platform 4300 may be implemented or provided with a wide variety of components or systems including, for example, one or more of the following: a central processing unit, a co-processor, memory, registers, and other data processing devices and subsystems.

Communication channel 1400 may include, alone or in any suitable combination, a telephony-based network, a local area network (LAN), a wide area network (WAN), a dedicated intranet, the Internet, a wireless network, a bus, or a backplane. Further, any suitable combination of wired and/or wireless components and systems may be incorporated into

TABLE 3

FIXED PAYMENT ARM AMORTIZATION TABLE
(WITH A HIGHER INTEREST RATE AT 6.00%)

| FIXED PAYMENT | Principal | Interest | Additional Principal Applied To The Outstanding Balance (fixed payment minus revised P&I payment amount) | Month | Loan Balanc |
|---|---|---|---|---|---|
| $664 | $99 | $500 | $65 | June 2003 | $99,835 |
| $664 | $100 | $499 | $65 | July 2003 | $99,670 |
| $664 | $101 | $498 | $65 | August 2003 | $99,503 |
| $664 | $102 | $497 | $65 | September 2003 | $99,336 |
| $664 | $102 | $496 | $65 | October 2003 | $99,168 |
| $664 | $103 | $495 | $65 | November 2003 | $99,000 |
| $664 | $104 | $495 | $65 | December 2003 | $98,830 |
| $664 | ... | ... | ... | ... | ... |
| $664 | $567 | $31 | $66 | December 2025 | $0 |

Figure 3:
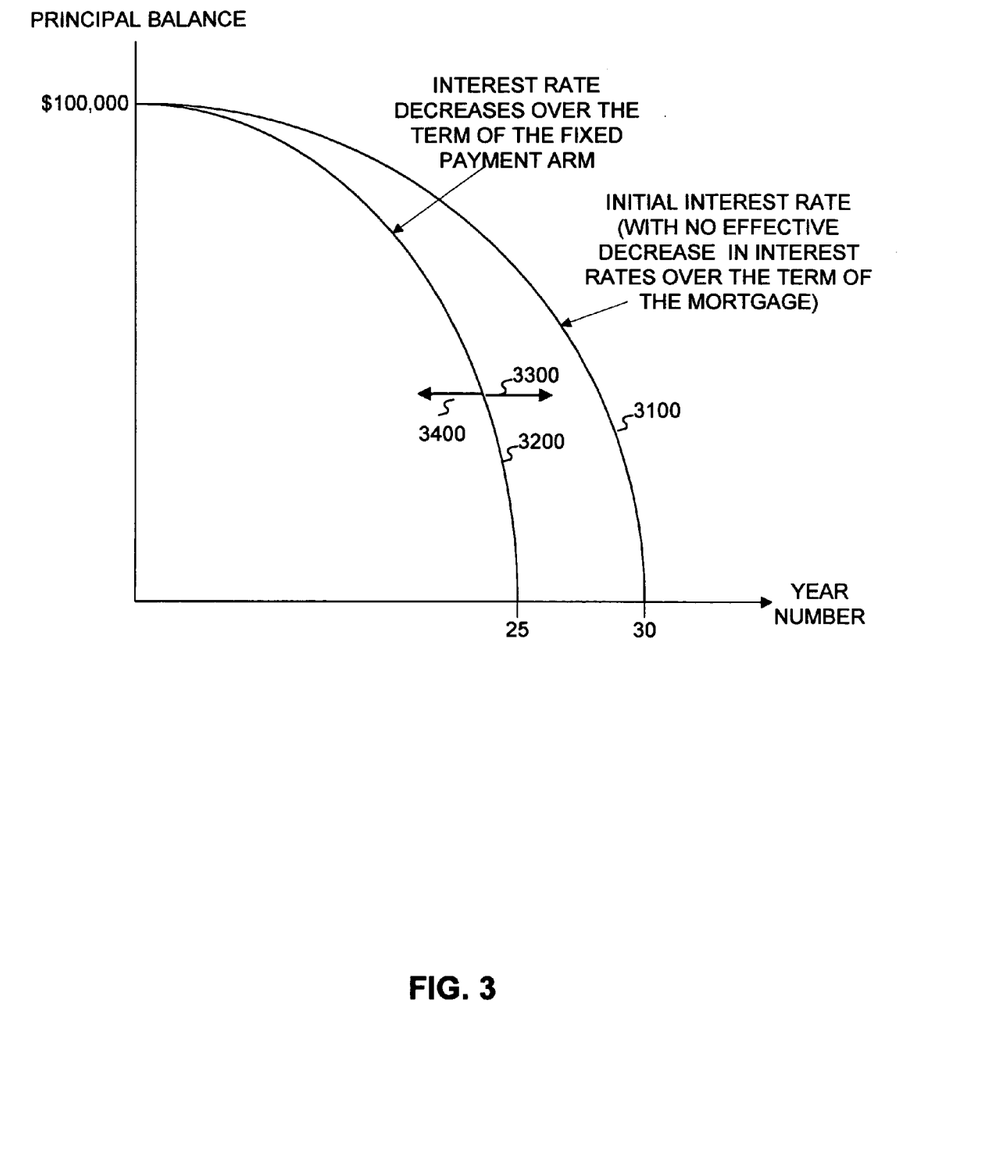
FIG. 3 is a diagram depicting interest rate variations of an adjustable rate mortgage with a fixed payment in accordance with systems and methods consistent with the present invention.

FIG. 3 depicts an exemplary curve representative of a fixed payment ARM, with an initial balance of $100,000. Curve 3100 represents an initial interest rate for the fixed payment ARM and depicts the loan balance over a 30-year term. In the case of curve 3100, the initial interest rate (or the effective interest rate) remains the same. As such, the mortgage is paid under its original 30-year term. In contrast, when current interest rates drop, the fixed payment ARM is modified to take advantage of lower interest rates, enabling the borrower to pay the loan in a shorter term, as can be seen by curve 3200. Regardless of whether interest rates rise 3300 or fall 3400, the term or interest rate will never exceed the interest rate and term of the original fixed payment ARM (depicted by curve 3100). The fixed payment ARM is thus a positively amortizing mortgage loan.

FIG. 4 depicts the exemplary system of FIG. 1 in greater detail with respect to lender 1500. As illustrated in FIG. 4, the system environment 4000 includes communication channel communication channel 1400. Communication channel 1400 may be embodied as bi-directional links or as unidirectional links.

Although computing platform 4300 may connect to lender 1510 and/or borrowers 1600, 1620 through network interface 4130 and communication channel 1400, computing platform 4300 may connect directly to lender 1510 and/or borrowers 1600, 1620.

Computing platform 4300 also communicates with input module 4100 and/or output module 4200 using connections or communication links, as illustrated in FIG. 4. Alternatively, communication between computing platform 4300 and input module 4100 or output module 4200 may be achieved using a network (not shown) similar to that described above for communication channel 1400. A skilled artisan would recognize that computing platform 4300 may be located in the same location or at a geographical separate location from input module 4100 and/or output module 4200 by using dedicated communication links or a network.

Input module 4100 may be implemented with a wide variety of devices to receive and/or store information. Referring to FIG. 4, input module 4100 may include an input device 4110 and/or a storage device 4120. Input device 4110 may further include a keyboard, a mouse, a disk drive, telephone, or any other suitable input device for receiving and/or providing information to computing platform 4300. Although FIG. 4 only illustrates a single input module 4100, a plurality of input modules 4100 may also be used. Storage device 4120 may be implemented with a wide variety of systems, subsystems and/or devices for providing memory or storage including, for example, one or more of the following: a read-only memory (ROM) device, a random access memory (RAM) device, a tape or disk drive, an optical storage device, a magnetic storage device, a redundant array of inexpensive disks (RAID), and/or any other device capable of providing storage and/or memory.

Network interface 4130 may exchange data between the communication channel 1400 and computing platform 4300. In one embodiment of the invention, network interface 4130 may permit a connection to at least one or more of the following networks: an Ethernet network, an Internet protocol network, a telephone network, a radio network, a cellular network, a wireless local area network (LAN), or any other network capable of being connected to computing platform 4300.

Output module 4200 may include a display 4210 and/or a printer 4220. Output module 4200 may be used to display and or print, inter alia, an amortization table, a revised interest rate, and an outstanding balance associated with the fixed payment ARM. Moreover, output module 4200 may be used to print or display any information received, such as the fixed payment ARM application information, current interest rate information, an initial (or cap) interest rate, and/or a curve, such as the one depicted in FIG. 3. Although FIG. 4 only illustrates a single output module 4200, a plurality of spatially separated output modules 4200 may be used.

Database 4600 may store an outstanding mortgage balance, an initial interest rate, fixed payment ARM loan documents, amortization tables (or equations), and/or current interest rates. Although database 4600 is shown in FIG. 4 as being located with computing platform 4300, a skilled artisan would recognize that the database (or databases) may be located anywhere (or in multiple locations) and connected to computing platform 4300 via direct links or networks.

Figure 5:
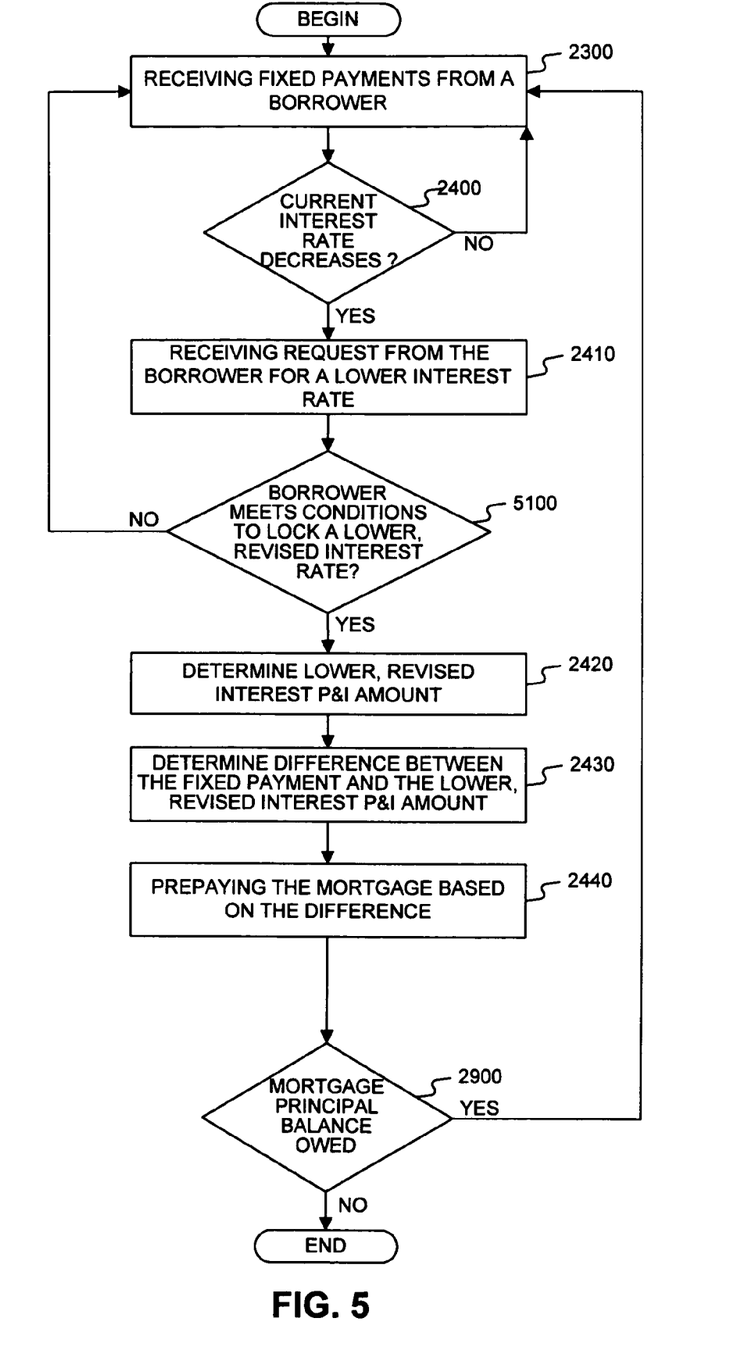
FIG. 5 is another exemplary flow chart which depicts modifying a fixed payment adjustable rate mortgage with a lower interest rate in accordance with systems and methods consistent with the present invention.

Moreover, in one embodiment, the fixed payment ARM may be structured so as to only permit adjustments to interest that are lower than the initial interest rate. Such an embodiment is depicted in FIG. 5. FIG. 5 further includes determining whether a borrower meets one or more terms and conditions before enabling an interest rate revision (or adjustment) (step 5100). Referring to FIG. 5, lender 1500 (or computing platform 4300 therein) may receive from borrower 1600, through communication channel 1400 or regular mail, fixed payments (or indications of payments) that are applied to the fixed payment ARM (step 2300). If current interest rates fall (or decrease), lender 1600 may automatically reduce the interest rate or receive from borrower 1600 a request to adjust the interest rate of the adjustable rate mortgage to a revised, lower interest rate (step 2400). In this embodiment, lender 1500 determines whether borrower 1600 meets one or more terms and conditions, stored in database 4600, before accepting a lower interest rate (step 5100). The exemplary terms and conditions are described in greater detail below. If borrower 1600 meets the conditions at step 5100, lender 1500 may determine a P&I amount at the revised, lower interest rate (step 2420), and determine a difference (if any) between the fixed payment and the revised, lower interest P&I amount (step 2430). Lender 1500 may then apply the difference to the mortgage, which serves to prepay the fixed payment ARM (step 2440). If there is any outstanding balance (step 2900), lender 1500 may continue to receive the fixed payments (step 2300).

In this embodiment, lender 1500 (or computing platform 4300) stores terms and/or conditions in database 4600. Terms and conditions may be defined in the mortgage, and may be agreed to at, or before, closing (see, e.g., step 2200 of FIG. 2). Examples of terms and conditions include: how the interest rate adjustments are calculated; such as based on Freddie Mac's 30-day required net yield plus a fixed amount; frequency and timing of the interest rate adjustments; whether the interest rate adjustments are automatic or if the borrower must request an adjustment, such as monthly, yearly, etc.; variability of the interest rate adjustment periods, such as permitting the interest rate to adjust annually for the first three years then adjust every five years thereafter; when the lender will automatically adjust the interest rate; when the borrower may request an interest rate adjustment, such as by the first of the month; any fees associated with adjusting the interest rate; when the lender can adjust the interest rate of the fixed payment ARM; how the lender can adjust the interest rate; the cap (or maximum) interest rate of the fixed payment ARM (which may be set to the initial interest rate); requirements concerning a borrower's credit history (or score); property appraisal requirements; requalification requirements (if any) at interest rate adjustment; escrow requirements; insurance requirements; minimum loan-to-value requirements; how frequently the lender can adjust the interest rate; and/or if the interest rate adjustments are guaranteed or conditioned on the borrower's requalification or other conditions.

One of ordinary skill in the art may recognize the terms of a fixed or adjustable rate mortgage may be modified to incorporate the features of a fixed payment ARM. Moreover, the lender may assess fees for such a modification.

The system 4000 may be embodied in various forms including, for example, a data processor, such as a computer that also includes a database. Moreover, the above-noted features and other aspects and principles of the present invention may be implemented in various environments. Such environments and related applications may be a special purpose (or dedicated) computer that is constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include for example machine code, such as produced by a compiler, and files containing a high level code that can be executed by the computer using an interpreter.

Furthermore, although the embodiments above refer to processing information related to mortgage loans secured by improved real property, systems and methods consistent with the present invention may process information related to other types of loans or credit instruments, including those secured by property, such as automobiles and/or personal property. Moreover, a mortgage that represents a fixed payment ARM may be securitized, sold, exchanged, transferred, kept in trust, and/or aggregated with other mortgages in a pool. Furthermore, one of ordinary skill in the art will recognize that Tables 1-3 are only exemplary amortization tables with estimated dollar and time values.

What is claimed is:

1. A computer-implemented method for controlling a system to provide a mortgage, said method comprising:
   receiving a fixed payment for the mortgage, the fixed payment being based on an initial interest rate serving as a maximum interest rate, the initial interest rate being based on a current interest rate;
   qualifying, when the current interest rate has declined, a first revised interest rate for an outstanding balance of the mortgage based on information retrieved from an electronic database, the first revised interest rate being lower than the maximum interest rate, wherein qualifying includes determining, using a computer processor, the first revised interest rate and evaluating a loan to value ratio, an appraisal of a property, and a credit history;
   determining, when the current interest rate has increased and using the computer processor, a second revised interest rate for the outstanding balance of the mortgage, wherein the second revised interest rate is greater than the first revised interest rate and does not exceed the maximum interest rate;
   determining, using the computer processor, a principal and interest amount based on at least one of the first revised interest rate and the second revised interest rate;
   determining, using the computer processor, a difference between the fixed payment and a sum of the principal and interest amount; and
   reducing a principal balance of the mortgage based on the difference, wherein the current interest rate varies over time.

2. The method of claim 1, wherein reducing the principal balance comprises:
   prepaying the mortgage by the difference.

3. The method of claim 1, wherein reducing the principal balance comprises:
   reducing a term associated with the mortgage.

4. The method of claim 1, further comprising:
   offering the mortgage to one or more borrowers.

5. The method of claim 1, further comprising:
   receiving a request for a lower interest rate, the lower interest rate being based on the current interest rate.

6. The method of claim 5, further comprising:
   accepting the request.

7. The method of claim 1 further comprising:
   receiving an indication of an adjusted interest rate, the adjusted interest rate serving as at least one of the first revised interest rate and the second revised interest rate.

8. The method of claim 1 further comprising:
   determining at least one of the first revised interest rate and the second revised interest rate based on the current interest rate plus a fixed amount.

9. The method of claim 1 further comprising:
   determining at least one of the first revised interest rate and the second revised interest rate based on the current interest rate, the current interest rate not exceeding the initial interest rate.

10. The method of claim 1, wherein determining the principal and interest amount further comprises:
    determining the principal and interest (P&I) amount based on the following equation:

$$P\&I\ \text{Amount} = \text{Loan Amount} \times \frac{\text{Lower Interest Rate}}{\text{Interest Factor}},$$

wherein the Interest Factor is determined based on the following equation:

$$\text{Interest Factor} = [1-(1+\text{Monthly Interest})]^{-Periods}.$$

11. The method of claim 1 further comprising:
    increasing at least one of the first revised interest rate and the second revised interest rate based on the current interest rate.

12. The method of claim 11, wherein determining the principal and interest amount further comprises:
    using at least one of the increased first revised interest rate and the increased second revised interest rate to determine the principal and interest amount.

13. The method of claim 12, further comprising:
    decreasing, after qualifying the increased first revised interest rate or after determining the increased second revised interest rate, at least one of the increased first revised interest rate and the increased second revised interest rate.

14. The method of claim 1, further comprising:
    determining whether one or more terms and conditions are satisfied.

15. The method of claim 1, further comprising:
    using the fixed payment for an entire term associated with the mortgage.

16. The method of claim 1, wherein receiving further comprises:
    receiving an indication that the fixed payment has been received.

17. The method of claim 1, further comprising:
    determining the fixed payment based on the initial interest rate, a principal balance at close of the mortgage, and a term at close of the mortgage.

18. The method of claim 1 further comprising:
    determining the principal and interest amount based on at least one of the first revised interest rate and the second revised interest rate, the principal balance remaining on the mortgage, and a term remaining on the mortgage.

19. The method of claim 18, further comprising:
    reducing the principal balance remaining on the mortgage by crediting payment of the fixed payment.

20. The method of claim 19, wherein reducing further comprises:
    reducing the principal balance to amortize the mortgage positively.

21. A system, comprising:
    means for receiving an indication that a fixed payment for a mortgage has been received, the fixed payment being based on an initial interest rate serving as a maximum interest rate, the initial interest rate being based on a current interest rate;

means for qualifying, when the current interest rate has declined, a first revised interest rate for an outstanding balance of the mortgage, the first revised interest rate being lower than the maximum interest rate, wherein qualifying includes determining the first revised interest rate and evaluating a loan to value ratio, an appraisal of a property, and a credit history;

means for determining, when the current interest rate has increased, a second revised interest rate for the outstanding balance of the mortgage, wherein the second revised interest rate is greater than the first revised interest rate and does not exceed the maximum interest rate;

means for determining a principal and interest amount based on at least one of the first revised interest rate and the second revised interest rate; and means for determining a difference between the fixed payment and a sum of the principal and interest amount, the difference prepaying the mortgage, wherein the current interest rate varies over time.

22. A system, said system comprising:

at least one computer-readable memory containing code executed by a processor, the code comprising:

code that receives an indication that a fixed payment for a mortgage has been received, the fixed payment being based on an initial interest rate serving as a maximum interest rate, the initial interest rate being based on a current interest rate;

code that qualifies, when the current interest rate has declined, a first revised interest rate for an outstanding balance of the mortgage, the first revised interest rate being lower than the maximum interest rate, wherein qualifying includes determining the first revised interest rate and evaluating a loan to value ratio, an appraisal of a property, and a credit history;

code that determines, when the current interest rate has increased, a second revised interest rate for the outstanding balance of the mortgage, wherein the second revised interest rate is greater than the first revised interest rate and does not exceed the maximum interest rate;

code that determines a principal and interest amount based on at least one of the first revised interest rate and the second revised interest rate; and code that determines a difference between the fixed payment and a sum of the principal and interest amount, the difference prepaying the mortgage, wherein the current interest rate varies over time.

23. The system of claim 22, further comprising:
code that reduces a term associated with the mortgage.

24. The system of claim 22 further comprising:
code that determines at least one of the first revised interest rate and the second revised interest rate based on the current interest rate and a fixed amount.

25. The system of claim 22 further comprising:
code that determines at least one of the first revised interest rate and the second revised interest rate based on the current interest rate that is lower than the initial interest rate.

26. The system of claim 22, wherein code that determines the principal and interest amount further comprises:
code that determines the principal and interest (P&I) amount based on the following equation:

$$P \& I \text{ Amount} = \text{Loan Amount} \times \frac{\text{Lower Interest Rate}}{\text{Interest Factor}}.$$

27. The system of claim 22 further comprising:
code that increases at least one of the first revised interest rate and the second revised interest rate based on the current interest rate.

28. The system of claim 27, wherein code that determines the principal and interest amount further comprises:
code that uses at least one of the increased first revised interest rate and the increased second revised interest rate to determine the principal and interest amount.

29. The system of claim 22, further comprising:
code that determines the fixed payment based on the initial interest rate, a principal balance at close, and a term at close.

30. A computer readable medium storing instructions which, when executed by a computer processor, perform a method comprising:

receiving an indication that a fixed payment for a mortgage has been received, the fixed payment being based on an initial interest rate, the initial interest rate serving as a maximum interest rate, the initial interest rate being based on a current interest rate;

qualifying, when the current interest rate has declined, a first revised interest rate for an outstanding balance of the mortgage, the first revised interest rate being lower than the maximum interest rate, wherein qualifying includes determining the first revised interest rate and evaluating a loan to value ratio, an appraisal of a property, and a credit history;

determining, when the current interest rate has increased, a second revised interest rate for the outstanding balance of the mortgage, wherein the second revised interest rate is greater than the first revised interest rate and does not exceed the maximum interest rate;

determining a principal and interest amount based on at least one of the first revised interest rate and the second revised interest rate; and determining a difference between the fixed payment and a sum of the principal and interest amount, the difference prepaying the mortgage, wherein the current interest rate varies over time.

31. The computer readable medium of claim 30, wherein the method further comprises:
reducing a term associated with the mortgage.

32. The computer readable medium of claim 30, wherein the method further comprises:
code that determines at least one of the first revised interest rate and the second revised interest rate based on the current interest rate plus a fixed amount.

33. The computer readable medium of claim 30, wherein the method further comprises:
code that determines at least one of the first revised interest rate and the second revised interest rate based on the current interest rate that does not exceed the initial interest rate.

* * * * *